United States Patent [19]

Beyrich et al.

[11] Patent Number: 5,307,677
[45] Date of Patent: May 3, 1994

[54] FLOW RATE METER

[75] Inventors: Hans Beyrich, Ludwigsburg; Heinz Gneiss, Freiberg/Geisingen, both of Fed. Rep. of Germany

[73] Assignee: Robert Bosch GmbH, Stuttgart, Fed. Rep. of Germany

[21] Appl. No.: 26,659

[22] Filed: Mar. 5, 1993

[30] Foreign Application Priority Data

Mar. 11, 1992 [DE] Fed. Rep. of Germany ....... 4207676

[51] Int. Cl.⁵ ............................................. G01F 1/68
[52] U.S. Cl. .................................................. 73/204.26
[58] Field of Search ............ 73/204.25, 204.26, 204.27

[56] References Cited

U.S. PATENT DOCUMENTS 3,333,470  8/1967  Fingerson ...................... 73/204.26
4,549,433 10/1985  Gneiss et al. .

FOREIGN PATENT DOCUMENTS 3328853  8/1983  Fed. Rep. of Germany .
3941330  6/1990  Fed. Rep. of Germany ... 73/204.25
0236023 11/1985  Japan ................................ 73/204.26

OTHER PUBLICATIONS

"Fertigungsverfahren in der Geratetechnik" by Prof. Dr. Ing. Franz Grunwald.

Primary Examiner—Herbert Goldstein
Attorney, Agent, or Firm—Edwin E. Greigg; Ronald E. Greigg

[57] ABSTRACT

A flow rate meter including a substrate having at least one temperature-dependent resistor layer applied to it is retained in the flow of a medium by two retaining bodies parallel to one another. These retaining bodies are secured in a base body with a relatively small spacing from one another, which means the base body is not undesirably large in size. The novel flow rate meter permits one to reduce the size of the base body. Beginning at one connecting segment each, which extend parallel to one another, of each retaining body, each retaining body has a securing segment inclined with respect to the other retaining body; the securing segments protrude into the base body, extending directly next to one another. The flow rate meter is suitable in particular for measuring the mass or flow rate of aspirated air int he air intake tube of an internal combustion engine.

2 Claims, 1 Drawing Sheet

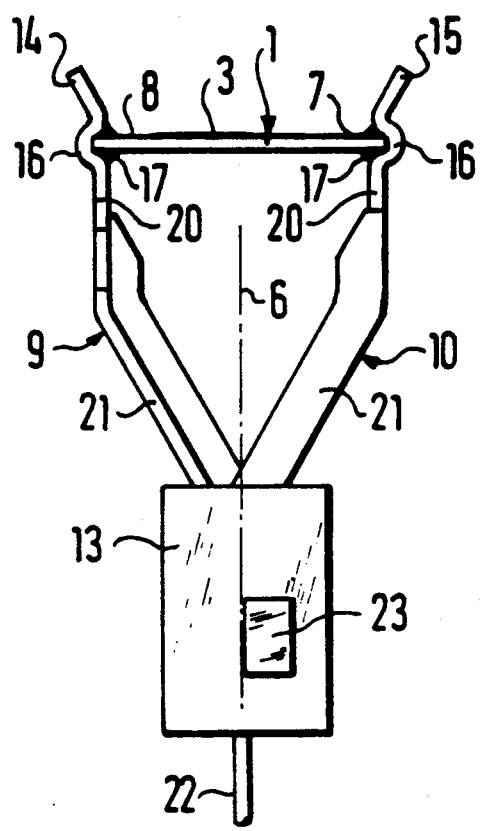
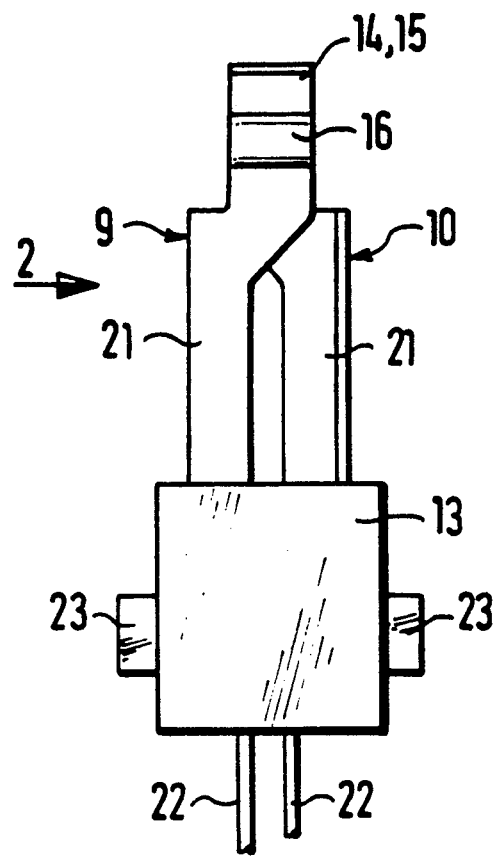
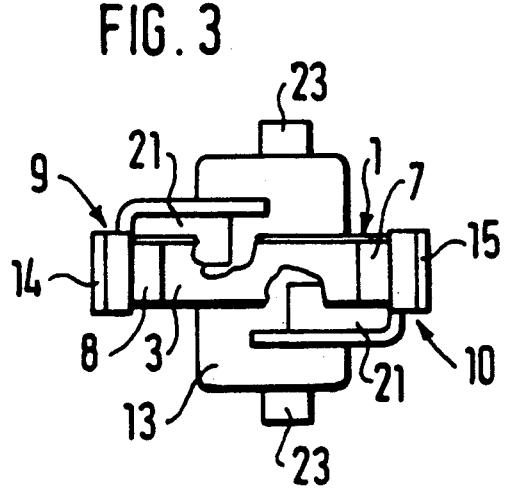

FLOW RATE METER

BACKGROUND OF THE INVENTION

The invention is based on a flow rate meter as defined hereinafter. A flow rate meter is already known (DE-OS 33 28 853), in which a flat substrate with a temperature-resistor layer applied onto it is retained in a flow of a medium by means of U-shaped retaining segments of retaining bodies. The electrically conductive retaining bodies are disposed extending parallel to one another, so that they are secured in a base body spaced widely apart from one another; as a result, not only is a large base body necessary, but the electrical connection to the retaining bodies are located far apart, which makes it more difficult to connect them electrically.

OBJECT AND SUMMARY OF THE INVENTION

The flow rate meter according to the invention has an advantage over the prior art that it makes a relatively small base body possible, with electrical connections located relatively close together.

An especially advantageous feature is for the securing segment of each retaining body to be provided with an angular cross section, for the sake of adequately high resistance to vibration and adequately high rigidity.

It is also advantageous for one securing segment to extend offset from the free end counter to the direction of the flow of the medium, and for the other securing segment to be offset from the free end in the flow direction, as a result of which an adequately wide insulating spacing in the base body between the retaining bodies can be adhered to, despite the small form of the base body.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 1 is a front view of the flow rate meter in the flow direction of the medium;

FIG. 2 shows a side view of the flow rate meter; and

FIG. 3 shows a plan view of the flow rate meter.

DESCRIPTION OF THE PREFERRED EMBODIMENT

The flow rate meter shown in FIGS. 1 through 3, intended particularly for measuring the flow rate or mass of aspirated air in the air intake tube of an internal combustion engine, has a substrate 1, on whose surface at least one temperature-dependent resistor layer 3 is disposed in the middle region of the substrate, for instance on the top extending in the flow direction 2 of the medium.

The substrate 1 is flat and has a rectangular cross section both in the medium flow direction 2 and transversely to the medium flow direction 2, such that it is embodied as quite thin in the direction of a sensor axis 6, while its width transverse to the medium flow direction 2 is a multiple of its width in the medium flow direction 2, being approximately three to five times, and preferably approximately four times, its width in the medium flow direction.

The substrate 1 is fabricated from an electrically non-conducting material, such as ceramic, and on the right and left of its surface it has electrically conductive connecting layers 7 and 8 that are connected to the temperature-dependent resistor layer 3 and have an electrical resistance less than that of the resistor layer 3.

The disposition of the substrate 1 in the flow of the medium is suitably selectly such that the surface of the substrate 1 receiving the resistor layer 3 extends approximately parallel to the medium flow direction 2. The substrate 1 is supported in the medium flow by means of a left retaining body 9 and a right retaining body 10. The retaining bodies 9, 10 are identically fabricated from metal having good electrical conductivity and poor thermal conductivity, and they are secured on one end in an electrically nonconductive base body 13, for example being cast in a base body 13 of plastic. The retaining bodies 9, 10 have a flat cross section transversely to the sensor axis 6; by way of example, they are produced from a metal strip. The left retaining body 9 has a free end 14 and the right retaining body 10 as a free end 15, both ends protruding from the base body 13. Near their free ends 14, 15, a retaining segment 16 bent in the form of a claw and curved outward in a U, is formed on each retaining body 9, 10; each segment 16 contacts a different face end of the substrate 1, protruding partway past the substrate 1, and each exerts a force upon the substrate 1 in the direction of the sensor axis in an elastically resilient manner in order to retain the substrate 1.

Each retaining segment 16 is electrically conductively connected to one of the connecting layers 7, 8, for example by means of a soldered connection 17. The U-shaped retaining segments 16 extend parallel to one another and each merges with a connecting segment 20; the connecting segments 20 likewise extend parallel to one another, as much as possible in the direction 2 of the flow of the medium. Beginning at each connecting segment 20, each retaining body 9, 10 has a securing segment 21 inclined with respect to the other retaining body in such a way that the securing segments 21, extending directly next to one another, protrude into the base body 13 and are secured directly side by side in it.

For stabilizing each retaining body 9, 10, each securing segment 21 has an angular cross section, which by way of example may be L-shaped. Viewed in the medium flow direction 2, the securing segment 21 of the left retaining body 9, for instance, is offset from the free end 14 counter to the medium flow direction 2, or in other words upstream, while the securing segment 21 of the right retaining body 10 is offset from the free end 15 in the medium flow direction, or in other words downstream. The securing segments 21 of each retaining body 9, 10 change inside the base body 13 into one electrical connection 22 each, and the ends of the electrical connections 22 remote from the securing segments 21 protrude from the base body 13. At least one guide protrusion 23 is formed on the base body, which enables a positionally correct disposition when the flow rate meter is installed in a housing carrying the flow of medium, for example the air intake tube of an internal combustion engine.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A flow rate meter, having at least one temperature-dependent resistor layer applied to a flat substrate, and disposed in a path of a flow medium, electrically conductive retaining bodies having a flat cross section, said electrically conductive retaining bodies are secured in an electrically insulating base body spaced from said flat substrate, each electrically conductive retaining body has a U-shaped retaining segment near their free ends which protrude from the base body, each retaining segment rests on a different face end of the substrate and protrude partway past the substrate and is electrically conductively connected to the at least one temperature-dependent resistor layer, each electrically conductive retaining body being adjoined by a connecting segment, the connecting segments extending parallel to one another, beginning at each connecting segment (20), the retaining bodies (9, 10) each have a securing segment (21) including two arms that extend at an angle relative to each other to form an angular cross section and each segment (21) is inclined toward each other in such a way with respect to the retaining body (9, 10) that the securing segments (21) protrude into the base body (13) extending immediately next to one another.

2. A flow rate meter, having at least one temperature-dependent resistor layer applied to a flat substrate, and disposed in a path of a flow medium, electrically conductive retaining bodies having a flat cross section, said electrically conductive retaining bodies are secured in an electrically insulating base body spaced from said flat substrate, each electrically conductive retaining body has a U-shaped retaining segment near their free ends which protrude from the base body, each retaining segment rests on different face end of the substrate and protrude partway past the substrate and is electrically conductively connected to the at least one temperature-dependent resistor layer, each electrically conductive retaining body being adjoined by a connecting segment, the connecting segments extending parallel to one another, beginning at each connecting segment (20), the retaining bodies (9, 10) each have a securing segment (21) which viewed in the medium flow direction (2), one securing segment (21) extends offset from the free end (14, 15) counter to the medium flow direction (2) and the other securing segment (21) extends offset from the free end (14, 15) in the medium flow direction (2) and each securing segment is inclined toward each other in such a way with respect to the retaining body (9, 10) that the securing segments (21) protrude into the base body (13) extending immediately next to another.

* * * * *